US009256445B2

(12) United States Patent
Claux et al.

(10) Patent No.: US 9,256,445 B2
(45) Date of Patent: Feb. 9, 2016

(54) DYNAMIC EXTENSION VIEW WITH MULTIPLE LEVELS OF EXPANSION

(75) Inventors: David Claux, Redmond, WA (US); Jason Todd Henderson, Tacoma, WA (US); Oleg Ouliankine, Redmond, WA (US); Michael Anthony Faoro, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/361,140

(22) Filed: Jan. 30, 2012

(65) Prior Publication Data

US 2013/0198627 A1    Aug. 1, 2013

(51) Int. Cl.
*G06F 3/048* (2013.01)
*G06F 9/44* (2006.01)
*G06F 3/0481* (2013.01)
*G06F 9/445* (2006.01)

(52) U.S. Cl.
CPC ............ *G06F 9/4443* (2013.01); *G06F 3/0481* (2013.01); *G06F 9/44526* (2013.01)

(58) Field of Classification Search
CPC . G06F 17/3089; G06F 11/1451; G06F 3/048; G06F 17/30525; G06F 17/30873; G06F 17/50; G06F 8/00; G06F 9/4443; G06F 9/4446; G06F 13/1684; G06F 13/4243; G06F 17/28; G06F 17/289; G06F 17/30896; G06F 8/10
See application file for complete search history.

(56) References Cited

U.S. PATENT DOCUMENTS

| 5,349,658 | A | 9/1994 | O'Rourke et al. |
| 5,877,757 | A | 3/1999 | Baldwin et al. |
| 5,986,657 | A | 11/1999 | Berteig et al. |
| 6,014,666 | A | 1/2000 | Helland et al. |
| 6,292,889 | B1 | 9/2001 | Fitzgerald et al. |
| 6,408,336 | B1 | 6/2002 | Schneider et al. |
| 6,449,643 | B1 | 9/2002 | Hyndman et al. |
| 6,530,075 | B1 | 3/2003 | Beadle et al. |
| 6,697,942 | B1 | 2/2004 | L'Heureux et al. |
| 6,754,896 | B2 | 6/2004 | Mishra et al. |
| 6,785,867 | B2 | 8/2004 | Shaffer et al. |

(Continued)

FOREIGN PATENT DOCUMENTS

| CN | 1747402 A | 3/2005 |
| CN | 1828529 A | 9/2006 |

(Continued)

OTHER PUBLICATIONS

U.S. Appl. No. 13/315,314, filed Dec. 9, 2011, entitled "Inference-Based Extension Activation".

(Continued)

*Primary Examiner* — William Bashore
*Assistant Examiner* — Rayeez Chowdhury
(74) *Attorney, Agent, or Firm* — Tom Wong; Louise Bowman; Micky Minhas (57) ABSTRACT

Application extension management may be provided. A plurality of related documents may be scanned to determine whether an activation trigger associated with an application extension has been triggered. In response to determining that the activation trigger associated with the application extension has been triggered, the application extension may be triggered and a user interface element associated with the application extension may be displayed according to a display rule.

20 Claims, 4 Drawing Sheets

(56) References Cited

U.S. PATENT DOCUMENTS

| | | | |
|---|---|---|---|
| 7,000,230 B1 | 2/2006 | Murray et al. | |
| 7,136,843 B2 | 11/2006 | Bigus et al. | |
| 7,219,234 B1 | 5/2007 | Ashland et al. | |
| 7,233,792 B2 | 6/2007 | Chang | |
| 7,243,336 B2 | 7/2007 | Brockway et al. | |
| 7,284,191 B2 | 10/2007 | Grefenstette et al. | |
| 7,333,956 B2 | 2/2008 | Malcolm | |
| 7,360,167 B2 | 4/2008 | Hennum et al. | |
| 7,506,263 B1 | 3/2009 | Johnston et al. | |
| 7,529,804 B1 | 5/2009 | Lu et al. | |
| 7,707,257 B2 | 4/2010 | Taieb et al. | |
| 7,765,212 B2 | 7/2010 | Surendran et al. | |
| 7,779,027 B2 | 8/2010 | James et al. | |
| 7,861,167 B2 | 12/2010 | Fernando et al. | |
| 7,912,822 B2 | 3/2011 | Bethlehem et al. | |
| 8,010,613 B2 | 8/2011 | Oral et al. | |
| 8,024,412 B2 | 9/2011 | McCann et al. | |
| 8,074,217 B2 | 12/2011 | James et al. | |
| 8,220,007 B1 | 7/2012 | Yeh et al. | |
| 8,250,518 B2 | 8/2012 | Averett et al. | |
| 8,255,280 B1 | 8/2012 | Kay et al. | |
| 8,275,356 B2 | 9/2012 | Hickie | |
| 8,429,286 B2 | 4/2013 | Pantos | |
| 8,578,507 B2 | 11/2013 | Faitelson et al. | |
| 8,826,455 B2 | 9/2014 | Julisch | |
| 8,843,822 B2 | 9/2014 | Claux et al. | |
| 8,959,425 B2 | 2/2015 | Ouliankine et al. | |
| 2002/0059347 A1* | 5/2002 | Shaffer et al. | 707/516 |
| 2002/0103824 A1 | 8/2002 | Koppolu et al. | |
| 2002/0171671 A1 | 11/2002 | Bou et al. | |
| 2003/0126592 A1 | 7/2003 | Mishra et al. | |
| 2003/0196172 A1* | 10/2003 | Bates et al. | 715/513 |
| 2004/0003389 A1 | 1/2004 | Reynar et al. | |
| 2004/0034860 A1 | 2/2004 | Fernando et al. | |
| 2004/0059813 A1 | 3/2004 | Bolder et al. | |
| 2004/0117799 A1 | 6/2004 | Brockway et al. | |
| 2004/0119745 A1 | 6/2004 | Bartek et al. | |
| 2005/0033728 A1* | 2/2005 | James et al. | 707/1 |
| 2005/0091184 A1 | 4/2005 | Seshadri et al. | |
| 2005/0144318 A1 | 6/2005 | Chang | |
| 2005/0188174 A1 | 8/2005 | Guzak et al. | |
| 2005/0229104 A1 | 10/2005 | Franco et al. | |
| 2005/0289113 A1 | 12/2005 | Bookstaff | |
| 2005/0289535 A1 | 12/2005 | Murray et al. | |
| 2006/0004739 A1 | 1/2006 | Anthony et al. | |
| 2006/0036725 A1 | 2/2006 | Chand | |
| 2006/0036965 A1 | 2/2006 | Harris et al. | |
| 2006/0069836 A1 | 3/2006 | Seo et al. | |
| 2006/0101053 A1 | 5/2006 | Proctor | |
| 2006/0155812 A1 | 7/2006 | Looman | |
| 2006/0168136 A1 | 7/2006 | Bethlehem et al. | |
| 2006/0173859 A1 | 8/2006 | Kim et al. | |
| 2006/0195575 A1 | 8/2006 | Delany et al. | |
| 2006/0218488 A1 | 9/2006 | Shah et al. | |
| 2007/0061401 A1 | 3/2007 | Bodin et al. | |
| 2007/0094408 A1 | 4/2007 | Gundla et al. | |
| 2007/0124696 A1 | 5/2007 | Mullender et al. | |
| 2007/0136603 A1 | 6/2007 | Kuecuekyan | |
| 2007/0156897 A1 | 7/2007 | Lim | |
| 2007/0156913 A1 | 7/2007 | Miyamoto et al. | |
| 2007/0226204 A1 | 9/2007 | Feldman | |
| 2007/0233791 A1* | 10/2007 | Sylthe et al. | 709/206 |
| 2007/0240098 A1* | 10/2007 | Averett et al. | 717/104 |
| 2007/0244987 A1 | 10/2007 | Pedersen et al. | |
| 2007/0261066 A1 | 11/2007 | Miyamoto et al. | |
| 2008/0059463 A1 | 3/2008 | Bauchot et al. | |
| 2008/0109448 A1 | 5/2008 | Aboel-Nil et al. | |
| 2008/0134162 A1 | 6/2008 | James et al. | |
| 2008/0155555 A1 | 6/2008 | Kwong | |
| 2008/0189360 A1 | 8/2008 | Kiley et al. | |
| 2008/0244440 A1 | 10/2008 | Bailey et al. | |
| 2008/0244443 A1 | 10/2008 | Schaw et al. | |
| 2008/0271157 A1 | 10/2008 | Faitelson et al. | |
| 2008/0294730 A1 | 11/2008 | Oral et al. | |
| 2008/0307046 A1 | 12/2008 | Baek et al. | |
| 2009/0006201 A1 | 1/2009 | Faseler, Jr. | |
| 2009/0044146 A1 | 2/2009 | Patel et al. | |
| 2009/0094332 A1 | 4/2009 | Schemers et al. | |
| 2009/0150981 A1 | 6/2009 | Amies et al. | |
| 2009/0164427 A1 | 6/2009 | Shields et al. | |
| 2009/0193444 A1 | 7/2009 | Clark et al. | |
| 2009/0210800 A1 | 8/2009 | McCann et al. | |
| 2009/0265139 A1 | 10/2009 | Klein et al. | |
| 2009/0265330 A1 | 10/2009 | Cheng et al. | |
| 2009/0300597 A1 | 12/2009 | George et al. | |
| 2009/0307652 A1 | 12/2009 | Maybee et al. | |
| 2009/0313554 A1 | 12/2009 | Haynes et al. | |
| 2009/0319911 A1 | 12/2009 | McCann et al. | |
| 2009/0327352 A1 | 12/2009 | Thomas et al. | |
| 2010/0011352 A1 | 1/2010 | Chu et al. | |
| 2010/0153915 A1 | 6/2010 | Schneider | |
| 2010/0257182 A1 | 10/2010 | Saliba et al. | |
| 2010/0262557 A1* | 10/2010 | Ferreira et al. | 705/348 |
| 2010/0287525 A1 | 11/2010 | Wagner | |
| 2010/0293586 A1 | 11/2010 | Simoes Rodrigues et al. | |
| 2011/0028138 A1 | 2/2011 | Davies-Moore et al. | |
| 2011/0029988 A1 | 2/2011 | Mittal et al. | |
| 2011/0072352 A1 | 3/2011 | Tanner et al. | |
| 2011/0087984 A1 | 4/2011 | Jitkoff et al. | |
| 2011/0093801 A1 | 4/2011 | Koyama et al. | |
| 2011/0113450 A1 | 5/2011 | Sharma et al. | |
| 2011/0145749 A1 | 6/2011 | Sailor et al. | |
| 2011/0154312 A1 | 6/2011 | Balko et al. | |
| 2011/0209159 A1 | 8/2011 | Baratz et al. | |
| 2011/0289056 A1 | 11/2011 | Xue et al. | |
| 2012/0005155 A1 | 1/2012 | Lynch et al. | |
| 2012/0023421 A1 | 1/2012 | Demant et al. | |
| 2012/0084644 A1 | 4/2012 | Robert et al. | |
| 2012/0094719 A1 | 4/2012 | Choi et al. | |
| 2012/0144282 A1 | 6/2012 | Loeb et al. | |
| 2013/0076598 A1* | 3/2013 | Sirpal et al. | 345/1.3 |
| 2013/0151942 A1 | 6/2013 | Ouliankine et al. | |
| 2013/0185362 A1 | 7/2013 | Clagg et al. | |
| 2013/0198623 A1 | 8/2013 | Claux et al. | |
| 2013/0198647 A1 | 8/2013 | Claux et al. | |

FOREIGN PATENT DOCUMENTS

| | | |
|---|---|---|
| CN | 101315624 A | 12/2008 |
| CN | 102141997 A | 8/2011 |

OTHER PUBLICATIONS

U.S. Appl. No. 13/361,097, filed Jan. 30, 2012, entitled "Extension Activation for Related Documents".

U.S. Appl. No. 13/361,219, filed Jan. 30, 2012, entitled "Intelligent Prioritization of Activated Extensions".

U.S. Appl. No. 13/351,310, filed Jan. 17, 2012, entitled "Installation and Management of client Extensions".

Bykov, Vassili, "Hopscotch: Towards User Interface Composition", In Proceedings of International Workshop on Advanced Software Development Tools and Techniques, Jul. 2008, 9 pages.

"Window Layout—Thunderbird", Retrieved on: Oct. 7, 2011, Available at: http://kb.mozillazine.org/Window_layout_-_Thunderbird.

"Manage Windows and Panels", Retrieved on: Oct. 10, 2011, Available at: http://help.adobe.com/en_US/InDesign/6.0/WS8599BC5C-3E44-406c-9288-C3B3BBEB5E88.html.

"Changes in Outlook 2010", Retrieved on: Oct. 10, 2011, Available at: http://technet.microsoft.com/en-us/library/cc179110.aspx.

"Extension Plug-ins for Processing Messages", Retrieved on: Oct. 10, 2011, Available at: http://docs.blackberry.com/en/admin/deliverables/25767/Ext_plugins_for_processing_msgs_595319_11.jsp.

"Glovia G2 Web Client—Full Windows Graphical user Interface Client within any Browser Supporting ActiveX" Retrieved on: Oct. 10, 2011, Available at: http://www.glovia.com/pdf/datasheets/GloviaWebClient.pdf.

"Gmail Contextual Gadgets Developer's Guide", Retrieved on: Oct. 17, 2011, Available at: http://code.google.com/apis/gmail/gadgets/contextual/.

"Installing Content Collector Notes Client Extension in Silent Mode", Retrieved on: Oct. 10, 2011, Available at: http://publib.boul- (56) References Cited

OTHER PUBLICATIONS der.ibm.com/infocenter/email/v2r2m0/index0.jsp?topic=%2Fcom. ibm.content.collector.doc%2Finstalling%2Ft_afu_install_nce_silent.htm.

"RSEMCE_235677.EXE—Remote Storage for Exchange v2.0 Mail Client Extension Install", Retrieved on: Oct. 10, 2011, Available at: http://www.symantec.com/business/support/index?page=content&pmv=print&impressions=&viewlocale=&id=TECH10485.

"Spam Filter", Retrieved on: Sep. 26, 2011, Available at: http://www.esoft.com/network-security-appliances/add-ons/spamfilter/.

"Thunderbird Email Thread Visualizer", Published on: Oct. 11, 2011, Available at: http://www.ghacks.net/2009/08/13/thunderbird-email-thread-visualizer/.

Aery, et al., "eMailSift: Email Classification Based on Structure and Content", In Proceedings of the Fifth IEEE International Conference on Data Mining, Nov. 27-30, 2005, pp. 18-25.

Bekkerman, et al., "Automatic Categorization of Email into Folders: Benchmark Experiments on Enron and SRI Corpora", In CIIR Technical Report IR-418, University of Massachusetts, 2004, pp. 1-23.

Dejean, et al., "What's new in IBM Lotus Notes and Domino V8", Published on: Mar. 20, 2007, Available at: http://www.ibm.com/developerworks/lotus/library/notes8-new/.

International Search Report and Written Opinion for PCT/US2012/066691 mailed Feb. 28, 2013.

Majid, et al., "NaCIN—An Eclipse Plug-In for Program Navigation-based Concern Inference", In Proceedings of the OOPSLA Workshop on Eclipse Technology eXchange, Oct. 16, 2005, pp. 70-74.

Nedos, et al., "Latte: Location and Time Triggered Email", In Proceedings of the International Conference on Pervasive Computing and Communications, Jun. 21-24, 2004, pp. 813-819.

Rohall, et al., "Email Visualizations to Aid Communications", In Proceedings of Late-Breaking Hot Topics, IEEE Symposium on Information Visualization, Oct. 2011, pp. 12-15.

U.S. Non-Final Office Action for U.S. Appl. No. 13/315,314 mailed Mar. 15, 2013.

U.S. Final Office Action dated Sep. 6, 2013 cited in U.S. Appl. No. 13/315,314, 26 pgs.

U.S. Office Action dated Sep. 10, 2013 cited in U.S. Appl. No. 13/361,219, 33 pgs.

International Search Report and Written Opinion for PCT/US2013/020915 mailed Apr. 23, 2013, 10 pgs.

International Search Report and Written Opinion for PCT/US2013/022823 mailed May 10, 2013, 10 pgs.

International Search Report and Written Opinion for PCT/US2013/022826 mailed May 10, 2013, 11 pgs.

International Search Report and Written Opinion for PCT/US2013/022615 mailed May 16, 2013, 9 pgs.

U.S. Office Action dated Aug. 13, 2013 cited in U.S. Appl. No. 13/351,310, 36 pgs.

Rex Thexton et al., "A Role-Based Approach to Automated Provisioning and Personalized Portals," Jan. 2011, 7 pgs., http://www.oracle.com/technetwork/articles/role-based-automated-provisioning-213244.html.

U.S. Office Action dated Dec. 19, 2013 cited in U.S. Appl. No. 13/315,314, 21 pgs.

U.S. Office Action dated Jan. 14, 2014 cited in U.S. Appl. No. 13/361,097, 18 pgs.

U.S. Final Office Action dated Mar. 3, 2014 cited in U.S. Appl. No. 13/361,219, 22 pgs.

U.S. Final Office Action dated Jun. 17, 2014 cited in U.S. Appl. No. 13/315,314, 19 pgs.

U.S. Final Office Action dated Jun. 4, 2014 cited in U.S. Appl. No. 13/361,097, 27 pgs.

U.S. Office Action dated Dec. 18, 2014 cited in U.S. Appl. No. 13/351,310, 59 pgs.

U.S. Office Action dated Dec. 22, 2014 cited in U.S. Appl. No. 13/361,097, 31 pgs.

Adams; "Getting Started with Gmail Contextual Gadgets"; DJ's Weblog; Jun. 21, 2010; 8 pgs. (cited in Jun. 10, 2015 EP Comm).

Cornell; "Developing Smart Tag DLLs"; Apr. 2001; Retrieved from: http://msdn.microsoft.com/library/default.asp?url=/library.en-us/dnsmarttag/html; 8 pgs. (cited in Jun. 10, 2015 EP Comm).

Chinese First Office Action dated Mar. 25, 2015 cited in Application No. 201210520996.X, 14 pgs. (w/translation).

EP Communication dated Jun. 10, 2015 cited in Appln No. PCT/US2012/066691, 10 pgs.

EP Supplementary Search Report Received in European Patent Application No. 13743289.4, Mailed Date: Jul. 10, 2015, 7 Pages.

U.S. Office Action dated May 7, 2015 cited in U.S. Appl. No. 13/361,097, 31 pgs.

U.S. Office Action dated Jun. 29, 2015 cited in U.S. Appl. No. 13/351,310, 25 pgs.

EP Extended Search Report Received in European Patent Application No. 13742862.9, Mailed Date: Aug. 14, 2015, 8 Pages.

EP Extended Search Report Received in European Patent Application No. 13744376.8, Mailed Date: Sep. 1, 2015, 9 Pages.

Chinese First Office Action dated Sep. 29, 2015 cited in Application No. 201310017749.2, 13 pgs. (w/translation).

\* cited by examiner

DYNAMIC EXTENSION VIEW WITH MULTIPLE LEVELS OF EXPANSION

RELATED APPLICATIONS

Related U.S. patent application Ser. No. 13/361,097, filed on Jan. 30, 2012 and entitled "Extension Activation for Related Documents,"assigned to the assignee of the present application, is hereby incorporated by reference in its entirety.

Related U.S. patent application Ser. No. 13/361,219 (now U.S. Pat. No. 8,843,822), filed on Jan. 30, 2012 and entitled "Intelligent Prioritization of Activated Extensions,"assigned to the assignee of the present application, is hereby incorporated by reference in its entirety.

BACKGROUND

A dynamic extension view may be provided. Software application extensions are computer-executable programming modules that may provide additional information displays and/or functionality to existing software applications. In conventional systems, these extensions can be difficult to manage via a traditional menu or multi-pane structure. In many situations, extension lists are presented to end-users in a rectangular pane wherein multiple contextual extensions may be shown at once. Since each extension needs its own rectangular pane to provide information or functionality to the user, showing multiple extensions can quickly clutter the host application's user interface.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

Application extension management may be provided. A plurality of related documents may be scanned to determine whether an activation trigger associated with an application extension has been triggered. In response to determining that the activation trigger associated with the application extension has been triggered, the application extension may be triggered and a user interface element associated with the application extension may be displayed according to a display rule.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Dynamic extension views may be provided. Software application extensions are computer-executable programming modules that may provide additional information displays and/or functionality to existing software applications. Such extensions may be distributed by the original developer of the software application and/or developed by companies and/or individuals not associated with the original developer of the software applications. For example, a third party may develop a mapping extension for use in an e-mail application. Such extensions may be activated within the user interface of the software application and/or may be displayed in new user interface panes (e.g., a separate window.)

Several mechanisms may be used to reduce extension clutter and optimize the end-user's experience. For example, extensions may not be expanded by default. Instead, a non-intrusive user interface (UI) element may be presented to the end-user to signal that extensions are available. The end-user may then click on that UI element to expand the extension pane. For another example, only one extension may be visible at a time. A UI element may list some and/or all of the available extensions, but only one extension may be selected at any given time. The end-user may freely switch from one extension to another and/or collapse/expand the extension pane at will. The UI element may comprise a conversation pane, which shows a stacked list of messages. Extensions may be displayed on each individual message and the user may expand/collapse/switch extension on any individual message.

Figure 1:
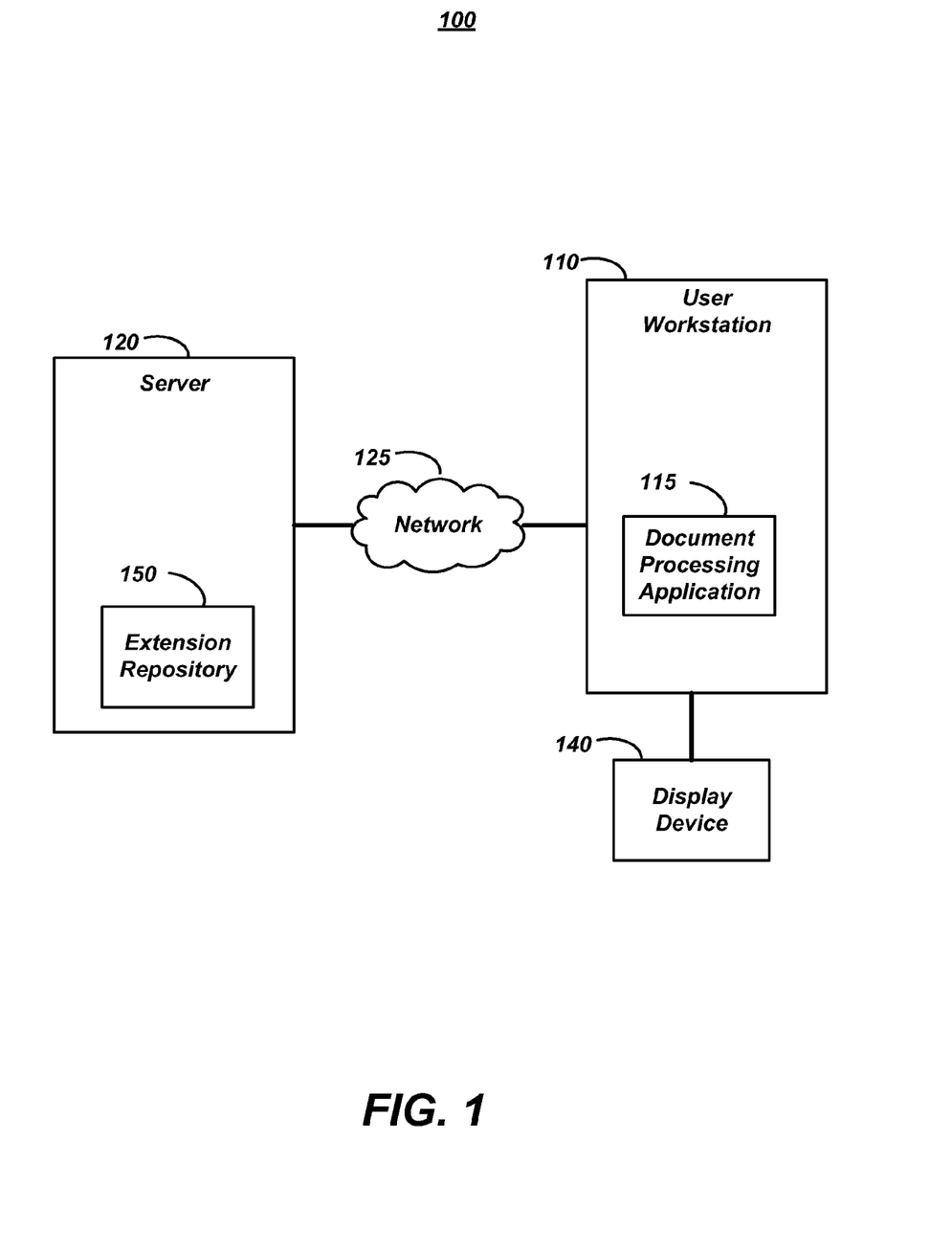
FIG. 1 is a block diagram of an operating environment.

FIG. 1 is a block diagram of an operating environment 100 for providing a dynamic extension view comprising a user workstation 110. User workstation 110 may comprise a document processing application 115 and may be operative to interact with a server 120 via a network 125. Server 120 may be operative to execute a plurality of applications and/or services. Document processing application 115 may comprise, for example, a word processing, spreadsheet, presentation, web browser, e-mail and/or other application. User workstation 110 may be operative to output application data and/or user interfaces to a display device 140, such as a monitor and/or touchscreen. User workstation 110 may comprise, for example, an electronic communications device such as a computer, laptop, cellular and/or IP phone, tablet, game console and/or other device. Document processing application 115 may be operative to communicate with server 120 and receive access to a plurality of extensions as configured in an extension repository 150. Extension management application 130 may be operative to provide information technology (IT) administrators with a centralized interface for managing extension settings and access permissions on a per-user, user group, and/or organization wide basis.

Figure 2A:
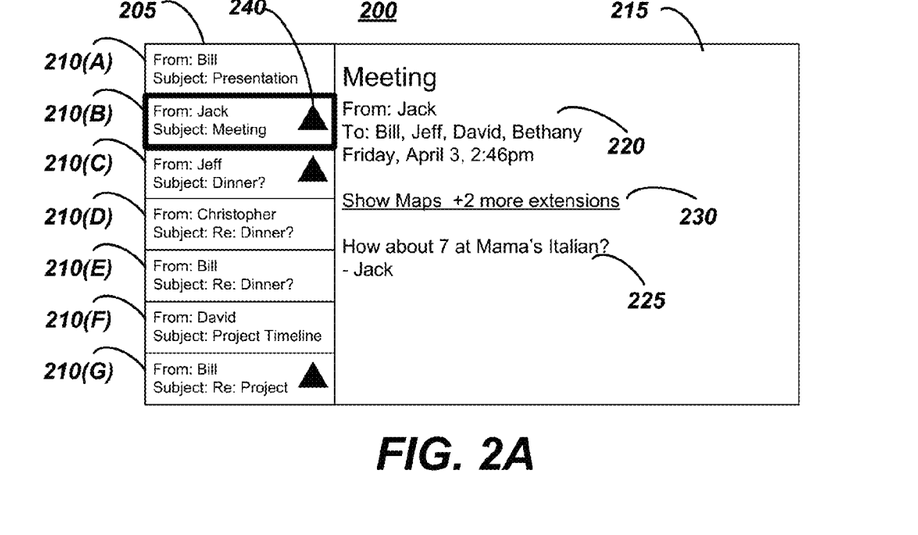
FIGS. 2A-2B are block diagrams of a user interface for providing a dynamic extension view.

FIG. 2A is a block diagram of a user interface 200 for providing dynamic extension views. User interface 200 may comprise a conversation pane 205 comprising a plurality of messages 210(A)-(G). User interface 200 may highlight a selected message, such as message 210(B), and display additional data associated with the selected message in a message pane 215. For example, message pane 215 may display user interface elements such as a message header 220 and a message text 225. Message pane 215 may further comprise UI element 230 that may indicate that extensions associated with the message are available. For each of plurality of messages 210(A)-(G), an entry point, such as entry point UI element 240 associated with message 210(B), may be displayed that lets the end-user know that the message has activated extensions. If no extensions are activated for the message, the entry point may not be shown.

Figure 2B:
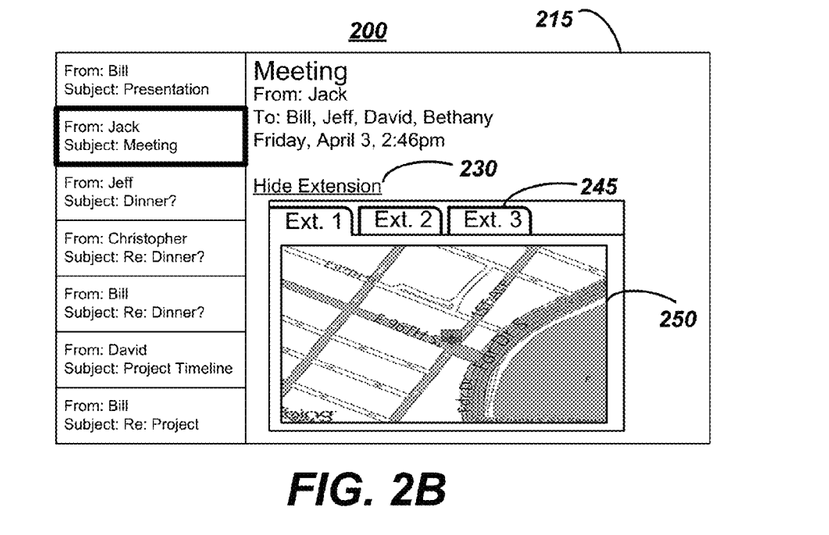

UI element 230 may list the name of an available extension and may also indicate the number of additional extensions that are available. For example, if only one extension is available, UI element 230 may read: "Show <extension name>." If more than one extension is available, UI element 230 may read: "Show <extension name>+N more extensions." When UI element 230 is clicked by a user, an extension pane 250 may be expanded as illustrated in FIG. 2B, below, and display the content of the extension that is explicitly named in the entry point. In at least some embodiments of the invention, selection of UI element 230 may result in display of a tabular interface 245 comprising a tab for each of the available extensions.

FIG. 2B is a block diagram of user interface 200 illustrating an expanded extension pane 250. UI element 230 may changes into "Hide extensions," which, when selected, may collapse extension pane 250. If more than one extension is activated and/or displayed, extension pane 250 may display a tabular interface that allows the end-user to switch between extensions. Consistent with embodiments of the invention, the tabular interface may be displayed instead of the "Show . . . " entry point, a single extension +a "Show all" command that reveals additional extensions may be displayed, and/or extensions may be displayed in a separate UI element (e.g., another window) instead of showing them inline in message pane 215.

Figure 3:
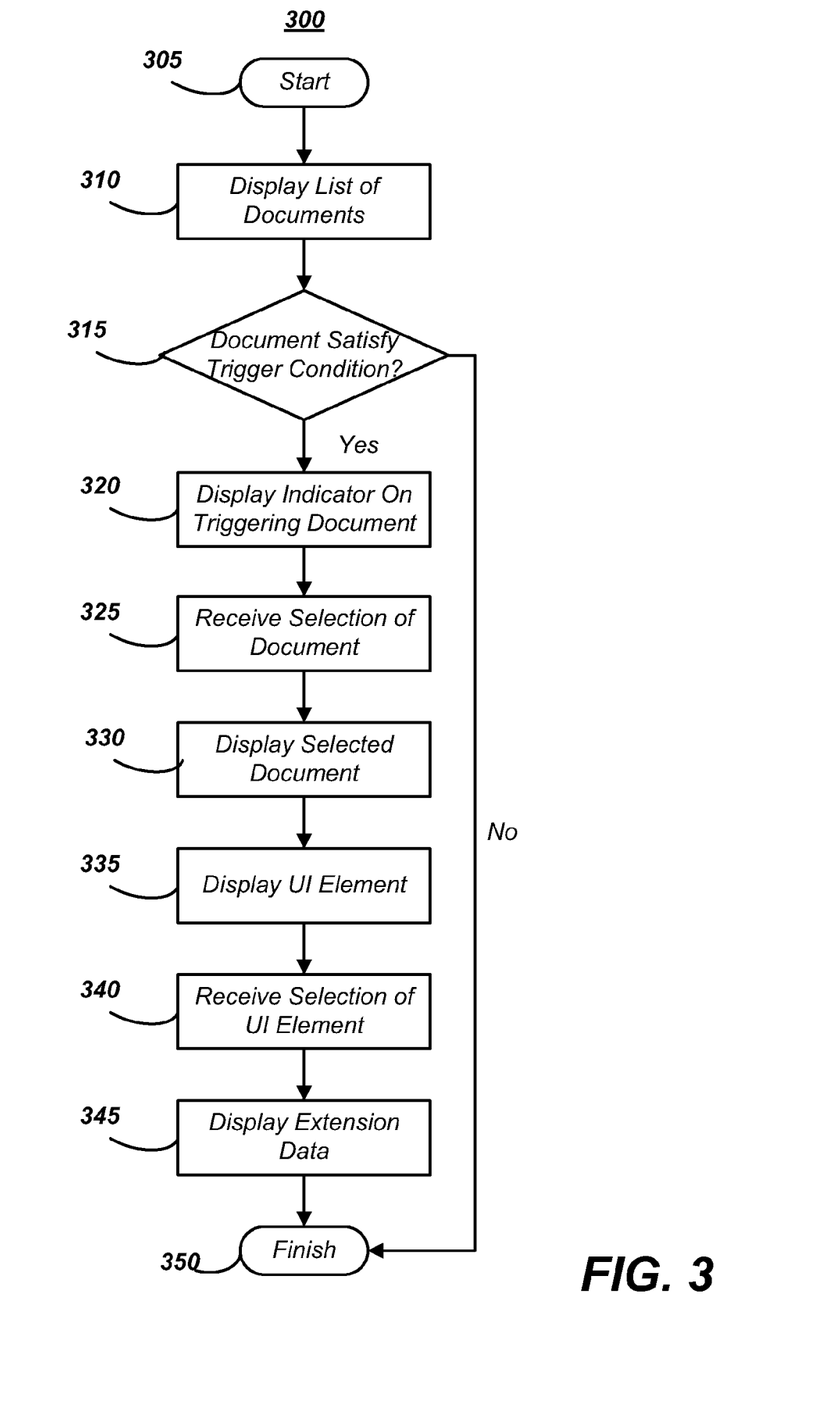
FIG. 3 is a flow chart of a method for providing a dynamic extension view.

FIG. 3 is a flow chart setting forth the general stages involved in a method 300 consistent with an embodiment of the invention for providing application extension management. Method 300 may be implemented using a computing device 400 as described in more detail below with respect to FIG. 4. Ways to implement the stages of method 300 will be described in greater detail below. Method 300 may begin at starting block 305 and proceed to stage 310 where computing device 400 may display a list of a plurality of related documents in a user interface pane. For example, the plurality of related documents may be displayed in conversation pane 205. The plurality of related documents may comprise, for example, a plurality of email messages, a plurality of web pages, a plurality of documents each associated with a common project, a plurality of word processing documents, a plurality of spreadsheet documents, a plurality of presentation documents, and/or a plurality of documents of differing types.

Method 300 may then advance to stage 315 where computing device 400 may determine whether at least one document of the plurality of related documents satisfies an activation trigger associated with at least one application extension. For example, a plurality of application extensions in extension repository 150 may be associated with document processing application 115. The related documents may comprise, for example, a thread of email messages that may be scanned to determine whether content of at least one of those messages satisfies an activation trigger for one and/or more of the application extensions, such as where an address block triggers a map display application extension.

In response to determining that the at least one of the plurality of related documents satisfies the activation trigger associated with the at least one application extension, method 300 may advance to stage 320 where computing device 400 may display an indicator on the list of the plurality of related documents that the at least one document satisfies the activation trigger associated with the at least one application extension. For example, an entry point, such as entry point UI element 240 associated with message 210(B), may be displayed that lets the end-user know that the message has available extensions.

Method 300 may then advance to stage 325 where computing device 400 may receive a selection of the at least one of the plurality of related documents. For example, a user may select one message of a thread of related messages in an email application.

Method 300 may then advance to stage 330 where computing device 400 may display at least a portion of the selected at least one document in a second user interface pane. For example, content associated with message 210(B) may be displayed in message pane 215.

Method 300 may then advance to stage 335 where computing device 400 may display a selectable user interface element proximate to the second user interface pane. For example, UI element 230 may be displayed in conversation pane 215. The selectable user interface element may comprise, for example, a name of the at least one application extension, a count of a plurality of application extensions associated with the selected at least one document, and/or a tab interface comprising tabs for each of the plurality of application extensions associated with the selected at least one document.

Method 300 may then advance to stage 340 where computing device 400 may receive a selection of the selectable user interface element. For example, a user may select the name of an application extension in UI element 230.

Method 300 may then advance to stage 345 where computing device 400 may display data associated with the at least one application extension. For example, a map display associated with a map extension may be displayed in a portion of the user interface associated with the at least one document, an expanded portion of the user interface associated with the at least one document, and/or a new user interface window. Method 300 may then end at stage 350.

An embodiment consistent with the invention may comprise a system for providing application extension management. The system may comprise a memory storage and a processing unit coupled to the memory storage. The processing unit may be operative to determine whether an activation trigger associated with an application extension has been triggered and, if so, activate the application extension and display a user interface element associated with the application extension according to a display rule. The display rule may be defined, for example, by a document management application, a user preference, metadata in the document, and/or the application extension's configuration.

Another embodiment consistent with the invention may comprise a system for providing application extension management. The system may comprise a memory storage and a processing unit coupled to the memory storage. The processing unit may be operative to display a list of a plurality of related documents in a user interface pane, determine whether at least one document of the plurality of related documents satisfies an activation trigger associated with at least one application extension, and, in response to determining that the at least one of the plurality of related documents satisfies the activation trigger associated with the at least one application extension, display an indicator on the list of the plurality of related documents that the at least one document satisfies the activation trigger associated with the at least one application extension and determine whether the at least one document comprises an actively selected document. In response to determining that the at least one document comprises the actively selected document, the processing unit may be operative to display at least a portion of the actively selected document and a user interface element associated with the at least one application extension. The processing unit may be further operative to receive a selection of the user interface element associated with the at least one application extension and display data associated with the application extension. The data associated with the application extension may be displayed, for example, inline in the at least one document and/or in a new user interface window.

Yet another embodiment consistent with the invention may comprise a system for providing application extension management. The system may comprise a memory storage and a processing unit coupled to the memory storage. The processing unit may be operative to display a list of a plurality of related documents in a user interface pane, determine whether at least one document of the plurality of related documents satisfies an activation trigger associated with at least one application extension, and, if so, display an indicator on the list of the plurality of related documents that the at least one document satisfies the activation trigger associated with the at least one application extension. The processing unit may be further operative to receive a selection of the at least one of the plurality of related documents, display at least a portion of the selected at least one document in a second user interface pane, display a selectable user interface element proximate to the second user interface pane, receive a selection of the selectable user interface element, and display data associated with the at least one application extension in at least one of the following: a portion of the user interface associated with the at least one document, an expanded portion of the user interface associated with the at least one document, and a new user interface window.

Figure 4:
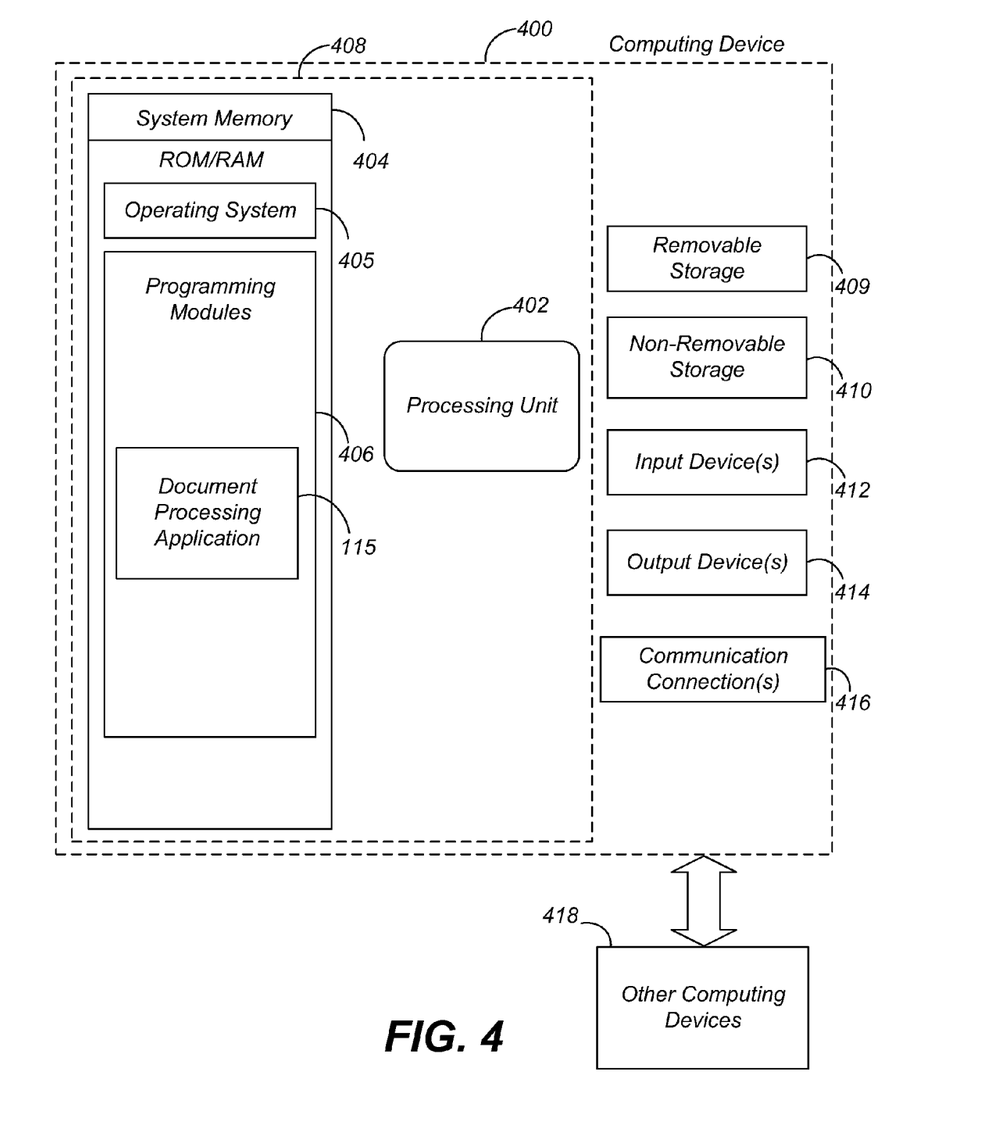
FIG. 4 is a block diagram of a computing device.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 4 and the associated descriptions provide a discussion of a variety of operating environments in which embodiments of the invention may be practiced. However, the devices and systems illustrated and discussed with respect to FIG. 4 are for purposes of example and illustration and are not limiting of a vast number of computing device configurations that may be utilized for practicing embodiments of the invention, described herein.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g., random access memory (RAM)), non-volatile (e.g., read-only memory (ROM)), flash memory, or any combination. System memory 404 may include operating system 405, one or more programming modules 406, and may include document processing application 115. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, a capture device, etc. A capture device may be operative to record a user and capture spoken words, motions and/or gestures made by the user, such as with a camera and/or microphone. The capture device may comprise any speech and/or motion detection device capable of detecting the speech and/or actions of the user. For example, the capture device may comprise a Microsoft® Kinect® motion capture device comprising a plurality of cameras and a plurality of microphones. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 may perform processes and/or methods as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each and/or many of the components illustrated above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any component of operating environment 100 may operate via application-specific logic integrated with other components of the computing device/system on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method for providing application extension management, the method comprising:
    determining that an activation trigger associated with one or more application extensions has been triggered by identifying content within at least one of a plurality of documents that satisfies the activation trigger; and
    in response to determining that the activation trigger associated with the one or more application extensions has been triggered:
        activating the one or more application extensions, wherein the one or more application extensions are configured to provide at least one of the following: information regarding where an application associated with each application extension is located, information regarding a count of application extensions, functionality to launch each of the one or more applications associated with each of the one or more application extensions;
        displaying a selectable user interface element associated with the one or more application extensions according to a display rule, wherein the display rule comprises displaying a selectable command text within the at least one document; and
        in response to receiving a selection of the selectable command text, displaying a tabular interface pane comprising a tab for each of the one or more application extensions, wherein the tabular interface pane displays content of a first application associated with a first application extension, and
    wherein switching from a first tab to a second tab switches display to a second application associated with a second application extension.

2. The method of claim 1, wherein the activation trigger is triggered by a document opened in a software application associated with at least one of the one or more application extensions.

3. The method of claim 2, wherein the display rule is associated with the software application.

4. The method of claim 2, wherein the display rule is associated with a meta-data element of the document.

5. The method of claim 1, wherein the display rule is associated with a user preference.

6. The method of claim 5, further comprising:
    receiving a modification to the display of the selectable user interface element associated with the one or more application extensions; and
    updating the user preference according to the modification.

7. The method of claim 1, further comprising:
    displaying a user interface element associated with the at least one document in a listing of the plurality of documents, wherein the user interface element comprises an indicator that the one or more application extensions are available in the at least one document.

8. The method of claim 7, wherein the indicator comprises a text element.

9. The method of claim 7, wherein the indicator comprises an icon.

10. The method of claim 7, further comprising:
    receiving a selection of the indicator; and
    displaying the tabular interface pane associated with the one or more application extensions.

11. The method of claim 10, further comprising:
    receiving a second selection of the selectable command text;
    hiding the tabular interface pane associated with the one or more application extensions.

12. A system for providing application extension management, the system comprising:
    a memory storage including computer-executable instructions; and
    a processing unit coupled to the memory storage, wherein upon executing the computer-executable instructions the processing unit is operable to:
        display a list of a plurality of related documents in a user interface pane;
        determine that content of at least one document of the plurality of related documents satisfies an activation trigger associated with one or more application extensions;
        in response to determining that the at least one document satisfies the activation trigger associated with the one or more application extensions, display an indicator on the list of the plurality of related documents that the at least one document satisfies the activation trigger associated with the one or more application extensions;
        in response to receiving a selection of the at least one document, display:
            at least a portion of the selected at least one document; and
            a selectable user interface element associated with the one or more application extensions, wherein a count of the one or more application extensions associated with the selected at least one document determines a display of the selectable user interface element, wherein the display comprises a command text; and
        in response to receiving a selection of the command text, display a tabular interface pane comprising a tab for each of the one or more application extensions associated with the selected at least one document, wherein the tabular interface pane displays content of a first application associated with a first application extension, and wherein switching from a first tab to a second tab switches display to a second application associated with a second application extension.

13. The system of claim 12, wherein the selectable user interface element comprises a name for each of the one or more application extensions associated with the selected at least one document.

14. The system of claim 12, wherein the selectable user interface element comprises a list of one or more application extensions associated with the selected at least one document.

15. The system of claim 12, wherein the processing unit is further operative to:
    receive a selection of the selectable user interface element associated with the one or more application extensions; and
    display data associated with the one or more application extensions.

16. The system of claim 15, wherein the data is displayed inline in the at least one document.

17. The system of claim 15, wherein the data is displayed in a new user interface window.

18. A computer-readable storage device storing a set of instructions which when executed causes a computing system to perform a method for providing application extension management, the method executed by the set of instructions comprising:
- displaying a list of a plurality of related documents in a user interface pane, wherein the plurality of related documents comprise at least one of the following: a plurality of email messages, a plurality of web pages, a plurality of documents each associated with a common project, a plurality of word processing documents, a plurality of spreadsheet documents, a plurality of presentation documents, and a plurality of documents of differing types;
- determining that content of at least one document of the plurality of related documents satisfies an activation trigger associated with one or more application extensions;
- in response to determining that the at least one document satisfies the activation trigger associated with the one or more application extensions, displaying an indicator on the list of the plurality of related documents that the at least one document satisfies the activation trigger associated with the one or more application extensions;
- receiving a selection of the at least one of the plurality of related documents;
- displaying at least a portion of the selected at least one document in a second user interface pane;
- displaying a selectable user interface element proximate to the second user interface pane, wherein a count of the one or more application extensions determines a display of the selectable user interfaces element; and
- displaying a tabular interface pane comprising a tab for each of the one or more application extensions associated with the selected at least one document, wherein a first tab of the tabular interface pane displays content of a first application associated with a first application extension;
- receiving a selection of a second tab in the tabular interface pane; and
- switching to display of a second application associated with a second application extension.

19. The computer-readable storage device of claim 18, wherein the selectable user interface element comprises a list of the one or more application extensions associated with the selected at least one document.

20. The computer-readable storage device of claim 18, wherein the indicator comprises an icon.

* * * * *